May 24, 1932.   A. VON DOSKY   1,859,726
APPARATUS FOR THE MANUFACTURE OF BRAKE LININGS AND THE LIKE

Filed April 4, 1930

Inventor:
Alfred von Dosky
By
Attorney

Patented May 24, 1932

1,859,726

UNITED STATES PATENT OFFICE

ALFRED von DOSKY, OF PLAUEN, GERMANY

APPARATUS FOR THE MANUFACTURE OF BRAKE LININGS AND THE LIKE

Application filed April 4, 1930, Serial No. 441,686, and in Germany April 30, 1929.

My invention relates to a process of and apparatus for the manufacture of brake linings and the like, more particularly for the brakes of motor cars. Such brake linings, brake blocks and the like consist of a textile fabric into which metal wires, studs and the like are preferably incorporated. The fabric is impregnated with a suitable compound and then subjected to a temperature of about 150° C. whereby the impregnated fabric becomes very hard and very durable for braking purposes.

Two working processes are known for the manufacture of such brake linings. According to one of these processes a cotton fabric, preferably mixed with thin metal wires, is impregnated with a lacquer and hardened by heating to 150 to 200° C. The textile fabric is preferably produced in the same manner as woven driving belts, i. e. as a continuous web of as great a length as possible. The further treatment takes place in any desired dimensions of the fabric as a continuous piece or in the form of individual thick brake blocks or as long thin brake bands consisting of a single piece. According to the other known process pieces are cut off of a long belt or tape woven from asbestos fibre with a metal insertion, according to the size of the lining to be produced, then impregnated, placed into a mould which imparts to it the final shape and ultimately hardened by the application of heat.

These two known processes are identical in so far as the second is completely covered by the first, because in one case individual thick brake blocks for wheel brakes and in the other case individual thin brake linings for band brakes are first cut to size, then shaped to their final form and then hardened. This process has the inherent serious defect that a considerable number of operations have to be carried out by hand and by means of special appliances, so that the production is more or less the work for craftsmen, requires a considerable number of tools, moulds, dies and the like and is very uneconomical as regards time and wages.

My invention eliminates these defects by providing a new continuous process for the manufacture of brake linings. It consists substantially in impregnating the long band consisting of a textile fabric with a hard lacquer and then passing it by means of a slowly revolving drum through a box heated to the requisite temperature, to be simultaneously moulded and hardened. During the passage of the belt or band through the box or the channel between the drum and box marks for the attachment holes are embossed into the belt and notches cut into it which define the length of the individual brake linings so that after the passage of the belt through the machine the finished linings may be lifted off the drum or roller practically ready for service.

According to my improved process the brake linings are shaped, hardened and trimmed without any manual work and in a continuous operation. The individual production by craftsmen is replaced by automatic mechanical mass production.

Apparatus suitable for carrying out my improved process is by way of example illustrated in the drawings affixed to my specification.

In the drawings:—

Figure 1:
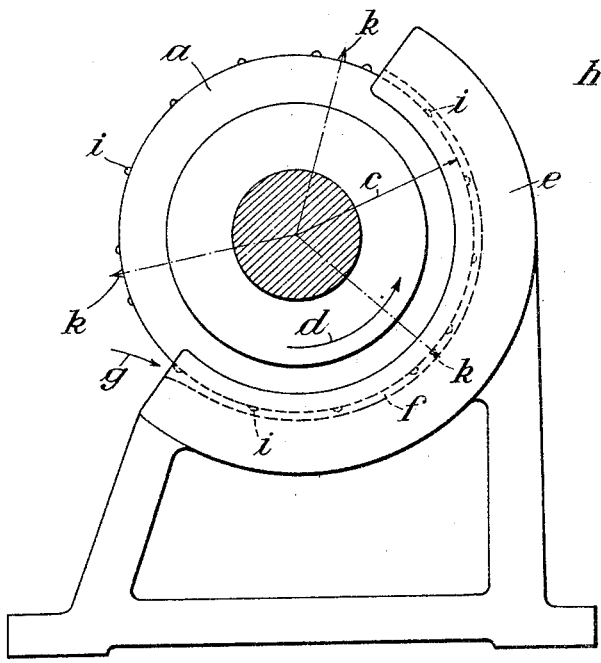
Fig. 1 is a side-elevation.

Referring to the drawings $a$ is the drum the working face $b$ of which is substantially equal to the width of the brake linings to be produced and the radius $c$ of which substantially corresponds with the inner radius of the curvature of the linings. This drum rotates at a very low circumferential speed in the direction of the arrow $d$ and is on a considerable portion of its circumference and its sides enclosed by a concentric U-shaped housing $e$ in such a manner that between the circumference of the drum and the bottom of the housing $e$ there remains an annular channel $f$ of rectangular cross-section which is equal to the cross-section of the linings to be produced. This channel $f$ is enlarged at its mouth, arrow $g$, to facilitate the introduction of the belt of textile fibre.

Figure 2:
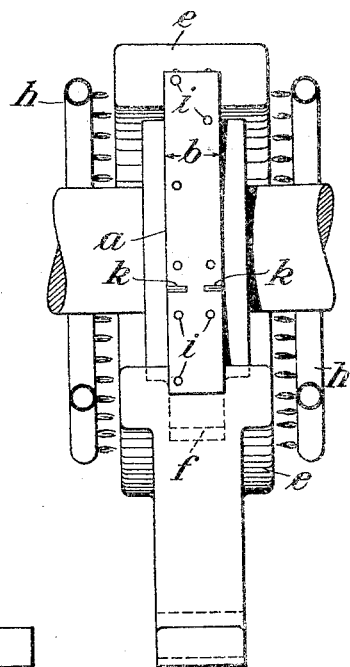
Fig. 2 is a front-elevation of the improved apparatus.

The housing or box $e$ is in any suitable manner heated to such an extent that the belt passed through the channel $f$ is heated to a temperature of about 150° C. during a single passage through the box. The box $e$ may be heated by superheated steam or gas flames, as indicated by the burners $h$ in Fig. 2 of the drawings.

On the circumference of the drum $a$ are provided spaced projections or punches $i$ which are pressed into the belt passing through the channel $f$ prior to the hardening of the belt and thus produce the center punches for the perforations for attaching the finished linings to the brake shoe or backing while, on the other hand, they function as carriers and ensure the smooth passage of the belt through the machine. On the circumference of the drum $a$ there are also mounted knives $k$ which produce two notches in opposite edges of the belt during its passage through the channel $f$ which facilitate the severing of the individual lengths. Up to a small central portion of the belt remaining between the knives, Fig. 2, the individual linings are thus separated from one another during the moulding and hardening. In the example illustrated three pairs of knives are provided spaced 120° apart. The apparatus thus produces three linings in one revolution of the drum. Assuming that the machine performs one revolution per minute 180 brake linings could be produced in one hour with this extremely simple apparatus (or with 1½ revolutions per minute 270 linings), a performance not remotely reached by any of the older processes.

The finished lengths of linings are taken off in about the position of the roller shown in Fig. 1 of the drawings. The lining covering the 120° sector at the top of the left-hand side is lifted off the drum $a$ and put away.

It will be understood that certain structural modifications may be made in my improved apparatus without departing from the spirit of my invention or the ambit of the appended claims.

I claim as my invention:—

1. An apparatus for producing brake bands, linings or the like from an endless band comprising a rotary drum having a circumferential curvature substantially equal to the curvature of the finished brake lining; a U-shaped housing partly and concentrically surrounding the periphery of the drum and spaced therefrom to accommodate the band; and a plurality of projections on the periphery of the drum adapted to aid in forcing the band through the space between the drum and the housing and to mark the band to indicate the exact locations for the securing perforations.

2. An apparatus for producing brake bands, linings or the like from an endless band comprising a rotary drum having a circumferential curvature substantially equal to the curvature of the finished brake lining; a U-shaped housing partly and concentrically surrounding the periphery of the drum and spaced therefrom to accommodate the band; a plurality of projections on the periphery of the drum adapted to aid in forcing the band through the space between the drum and the housing and to mark the band to indicate the exact locations for the securing perforations; and knives arranged on the periphery of the drum to provide transverse cuts in the edges of the band to indicate the line where the band is to be cut to the desired brake band length.

In testimony whereof I affix my signature.

ALFRED von DOSKY.